No. 683,336. Patented Sept. 24, 1901.
F. H. SCHULE.
GRAIN DECORTICATING MACHINE.
(Application filed May 17, 1901.)
(No Model.)

Witnesses:
Inventor:
Friedrich Hermann Schule.

UNITED STATES PATENT OFFICE.

FRIEDRICH HERMANN SCHULE, OF HAMBURG, GERMANY.

GRAIN-DECORTICATING MACHINE.

SPECIFICATION forming part of Letters Patent No. 683,336, dated September 24, 1901.

Application filed May 17, 1901. Serial No. 60,709. (No model.)

*To all whom it may concern:*

Be it known that I, FRIEDRICH HERMANN SCHULE, a subject of the German Emperor, and a resident of Hamburg, in the German Empire, have invented certain new and useful Improvements in Grain-Decorticating Machines, of which the following is a specification.

The present invention relates to improvements in grain-decorticating machines for removing the cuticle or outer hull from cereals and like fruits preparatory to grinding the farinaceous portion of such grain fruits into flour or in order to make such fruits ready for the market.

The improvements refer especially to that class of decorticating-machines in which a suitable, preferably conical, grinding or decorticating body roughened or provided on its outer periphery with a suitable decorticating-surface revolves in a suitable screen or sieve casing lined on its inner surface with a plurality of longitudinal ribs or wings acting as scrapers, these scrapers being of such thickness or respectively the decorticating-body and the sieve-casing being set at such distance apart as to give the requisite trituration and to rasp the cuticle or hull off the grain, &c., without mashing the latter.

The object of the improvements is to produce such a decorticating-machine which is exceedingly simple in construction, is efficient in use, requires only small driving power, secures smallest and uniform wear and tear of the working parts, prevents undue crushing or cracking of the grain, &c., and affords as to the quantity and quality the possibly highest results.

With this end in view my invention consists in certain novel features of construction and combinations of parts, as will be hereinafter fully described, and pointed out in the claims, with reference to the accompanying sheet of drawings, in which—

Figure 1:
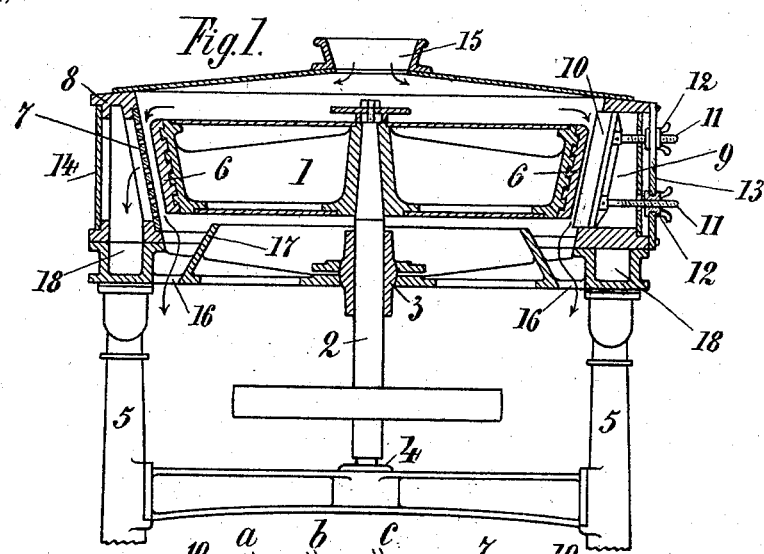
Figure 2:
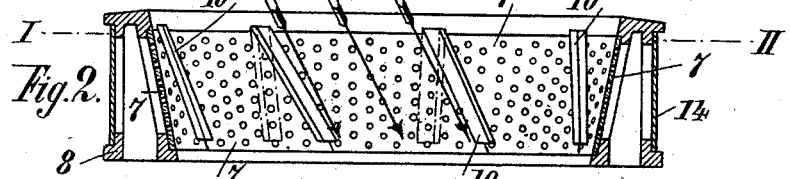
Figure 3:
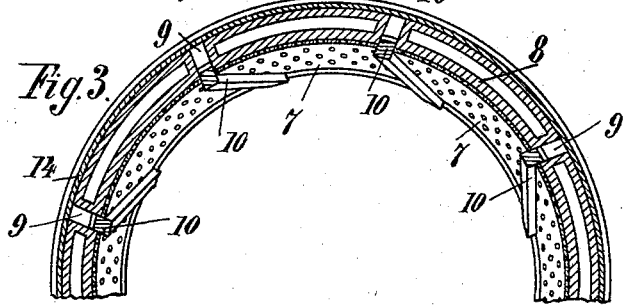
Figure 4:
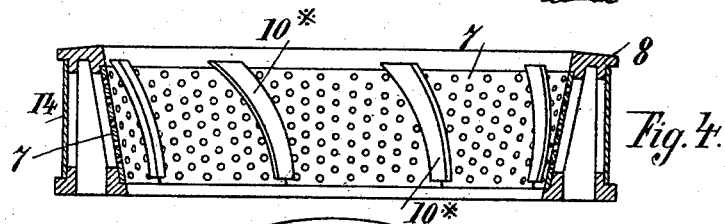

Figure 1 is a vertical section of a decorticating-machine made in accordance with my invention. Fig. 2 is a central vertical section of the sieve-casing, showing the arrangement of the scrapers. Fig. 3 is a horizontal cross-section through the sieve-casing and scrapers on the line I II, Fig. 2. Fig. 4 is a central vertical section, and Fig. 5 a top view or plan, of a sieve-casing provided with scrapers having a somewhat-modified form.

Similar numerals refer to similar parts throughout the several views.

Referring to Figs. 1 to 3, my improved decorticating-machine consists of an inverted conical drum 1, fixed upon a driving-shaft 2, which is mounted in suitable bearings 3 and 4 of a suitable frame 5. The conical drum or decorticating-body 1 is coated on its outer periphery with a grinding or decorticating surface or cover 6, composed of artificial-stone mass or stone-like composition, to which any degree of sharpness can be given.

The decorticating-drum 1 is surrounded by a conical casing or screen formed by sieves or sieve-plates 7, arranged in sections, each section having a diamond shape and being supported by correspondingly-shaped castings or brackets 8 of the machine-frame. The brackets as well as the sieve-sections are set a certain distance apart, so as to form between themselves radial oblique or inclined slots 9, adapted to receive the likewise-inclined wings or ribs 10, forming the scrapers. These scrapers 10, which fit snugly into the oblique slots 9, may be radially adjusted and secured in position by any suitable means, as by threaded spindles 11, working in adjusting screw-nuts 12, rotatably mounted in supporting-links 13, attached to the castings or brackets 8, as will be readily understood from Fig. 1. The brackets 8 are inclosed in a suitable sheet-iron mantle 14.

The grain to be decorticated is fed through the hopper 15 upon the upper surface of the revolving drum 1, which latter forces the grain by centrifugal action to travel outwardly and to run over the upper rim or edge of the said drum and finally to pass down through the ring-shaped space left between the revolving decorticating-drum and the stationary screen or sieve casing, the said ring-shaped space being divided by the inclined scrapers 10 into a plurality of inclined channels or passages. By the coöperation of the revolving decorticating-drum the screen or sieve casing and the inclined scrapers the hull or outer gray layer or the bran, respectively, is rasped off from the grains. The removed parts, dust, dirt, &c., fall through the screen or sieve casing into a channel 18, from where they may be carried away in any suitable manner. The decorticated grains or kernels leave the machine through holes or openings 16, provided in the bottom wall of the machine, a suitable distributing or guiding cone 17 facilitating the discharge of the finished grains.

From experience it results that for obviating undue cracking or crushing of the grains decorticating-cones of a comparatively large diameter must be used and the grains at the same time prevented from being for too long a period of time in the decorticating-machine or subjected to the decorticating action, respectively. Attempts have been made to attain this latter object by dividing the ring-shaped space between the screen and decorticating-drum into a plurality of separate channels or passages by means of scrapers (ribs or wings) provided on the inner surface of the screen-cone in such a manner that the way each grain has to perform is restricted to the passage through one of the said channels only. These wings or scrapers were generally placed or set parallel, or nearly parallel, to the generatrix of the screen-cone in the manner shown by dotted lines in Fig. 2. This mode of construction, however, has not proved quite correct and does not apply to the different movements the grains are subjected to when passing down between the screen and the revolving drum. In Fig. 2 I have indicated by arrows *a b c* the direction or path in which the grains are approximately moving along when passing between a stationary screen and a drum revolving with the sun. This line of motion is, or nearly is, the resultant of the horizontal motion imparted to a grain by the revolving drum and of the vertical motion due to the gravity or weight of the said grain. Supposing the scrapers are set according to the known mode of construction, as shown by dotted lines in Fig. 2, then only the grains which pass between the arrows *a* and *b* run through the machine in the desired minimum of time and are decorticated in the proper degree, while all the grains passing along between the arrows *b* and *c* strike against the scraper in front and being thus retained are pressed against the said scraper over and over again, whereby they are decorticated in too high a degree and, moreover, considerably heated, so that crushing and cracking of the same must necessarily take place or follow, respectively, when cooling again. The triangular part of the screen situated between the arrow *a* and the scraper in the rear remains utterly unused, so that in fact only a comparatively small portion (the diagonal middle portion) of the screen-section is active or efficient, wherefrom results also a non-uniform wear and tear of the said screen. All the above-stated inconveniences and drawbacks are, however, obviated when the scrapers, in accordance with the present invention, are set at an angle to the generatrix of the screen-cone or respectively parallel or nearly parallel to the line of motion in which the grains will actually move along. In such a construction, as will be readily understood from the drawings, no stowing of the grains can take place. The latter are rather enabled to pass freely between the scrapers and to leave the machine in a properly and uniformly decorticated, uncrushed, and uncracked state, the whole area of the screen being used and therefore a uniform wear and tear of the same secured.

Figure 5:
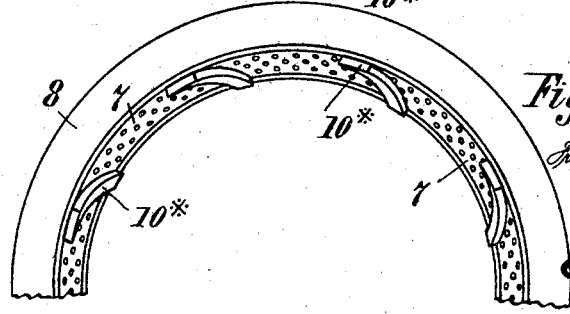

In the modification represented by Figs. 4 and 5 the scrapers 10*, although set at an angle to the generatrix of the screen-cone, are not straight, but slightly curved, equally good results being obtained also with this modified construction.

Having fully described my invention, what I claim, and desire to secure by Letters Patent, is—

1. In a decorticating-machine, the combination with a vertical revolving conical drum, of a stationary complementary conical screen surrounding said drum and scrapers positioned on the screen in substantially the direction of the resultant of the force of gravity and of the friction causing the decortication, substantially as and for the purpose set forth.

2. In a decorticating-machine, the combination with a revolving drum, of a stationary screen and scrapers thereon inclined in the direction of travel of the drum, said inclination being substantially in the direction of the resultant of the forces acting to carry the material to be decorticated between drum and screen, substantially as and for the purpose set forth.

3. In a decorticating-machine, the combination with a revolving conical drum arranged to centrifugally deliver material to its working face, of a stationary conical screen and scrapers thereon arranged in substantially the direction of the resultant of the forces acting on the material during decortication, substantially as and for the purpose set forth.

4. In a decorticating-machine, the combination with a revolving conical drum and hopper arranged to deliver material at the center of a closed end of said drum, of a stationary conical screen, scrapers thereon arranged in substantially the direction of the resultant of the forces acting on the material during decortication, and means for adjusting the scrapers at each end, substantially as and for the purpose set forth.

5. In a decorticating-machine, the combination with a vertical revolving conical drum having closed ends and of greater diameter than length, and a feed-hopper arranged to deliver material onto the upper end thereof, of a complementary screen surrounding said drum, curved scrapers thereon positioned in a line substantially the resultant of the force of gravity and of that acting to decorticate the material, and a cone below the drum arranged to discharge material through delivery-orifices at its periphery, substantially as and for the purpose set forth.

FRIEDRICH HERMANN SCHULE.

Witnesses:
 MAX KAEMPFF,
 E. H. L. MUMMENHOFF.